Patented Apr. 27, 1954

2,676,938

UNITED STATES PATENT OFFICE 2,676,938

SOLUTIONS COMPRISING AN AMMONIUM SALT OF A COPOLYMER OF VINYL ACETATE AND CROTONIC ACID DISSOLVED IN A MIXTURE OF WATER AND AN ALCOHOL

Benjamin F. Clark, Grand Island, N. Y., assignor to E. I. du Pont de Nemours and Company, Wilmington, Del., a corporation of Delaware No Drawing. Application January 31, 1952, Serial No. 269,345

2 Claims. (Cl. 260—29.6)

This invention relates to solutions of the ammonium salts of copolymers of vinyl acetate and crotonic acid.

Copolymers of vinyl acetate and crotonic acid containing from 2-15% by weight of copolymerized crotonic acid may be reacted with aqueous alkaline solutions to form aqueous solutions of the corresponding alkali salts of the crotonic acid copolymer. Solutions of the ammonium salt of the copolymer thus prepared are useful as coating compositions. When such solutions are spread upon a surface and dried, the ammonium salt is decomposed and ammonia is released, resulting in the formation of a water-insoluble film. The utility of the ammonium salt solutions, however, is limited because of the exceedingly high viscosities of such solutions containing around 20% or more of the copolymer. For example a 20% by weight solution of the ammonium salt of a vinyl acetate/crotonic acid copolymer containing 5% by weight of copolymerized crotonic acid has a viscosity at 20° C. greater than 100,000 centipoises. Such high-viscosity solutions cannot be spread by brushing and will not readily flow by gravity but have the consistency of an exceedingly thick paste or tar. A 10% aqueous solution of the same ammonium salt has a viscosity of 10 centipoises.

An object of the present invention is to prepare new and improved solutions of the ammonium salts of vinyl acetate/crotonic acid copolymers. A further object is to prepare such solutions containing up to around 50% by weight of the copolymer without exceeding viscosities in the neighborhood of 60,000 centipoises at temperatures of 20–30° C. Still other objects will be apparent from the following description of the invention.

In accordance with the present invention the above objects may be attained by dissolving an ammonium salt of a vinyl acetate/crotonic acid copolymer in a mixture of water and a saturated aliphatic alcohol miscible with water in the proportions utilized. The invention is illustrated by the following example.

Example

Ammonium hydroxide was added to mixtures of water with (a) methanol and (b) isopropanol, and different amounts of a vinyl acetate/crotonic acid copolymer containing about 5% by weight of copolymerized crotonic acid was added to such mixtures with stirring and heating until complete solution was obtained. The solutions then were cooled to 70° F. and viscosities of the cooled solutions were measured. In each case the amount of ammonium hydroxide utilized was equivalent to 2 moles of ammonium ion per mole of copolymerized crotonic acid in the copolymer. The proportions of water and alcohol in the mixtures and the viscosities of the resulting solutions are shown in the following tabulation:

| Alcohol | Ratio Alcohol to H₂O (by Vol.) | Viscosities in cp. of Solutions at Copolymer concentrations of 10-50% by Weight | | | | | Appearance of Solution |
|---|---|---|---|---|---|---|---|
| | | 10% | 20% | 30% | 40% | 50% | |
| Methanol | 3:1 | 10 | 198 | 1,400 | 3,680 | 25,600 | Clear. |
| Do | 1:1 | 28 | 268 | 2,260 | 31,600 | >100,000 | Do. |
| Do | 1:3 | 43 | 26,000 | >100,000 | | | Cloudy. |
| Isopropanol | 3:1 | 55 | 330 | 1,952 | 9,500 | 58,000 | Clear. |
| Do | 1:1 | 65 | 460 | 3,160 | 22,400 | Gel | Do. |
| Do | 1:3 | 88 | 11,800 | Gel | | | Cloudy. |

Preferably the alcohol used is a primary saturated aliphatic alcohol containing from 1 to 4 carbon atoms which is miscible with water in the proportions of alcohol and water utilized. Examples of such alcohols are methanol, ethanol, normal propanol, isopropanol and tertiary butanol. The ratio of alcohol to water in parts by volume should be not less than about 1:1 nor higher than about 5:1. As indicated by the results tabulated above, the optimum proportion may vary according to the alcohol utilized; and in order to avoid excessively high viscosity in the finished solution, the volumetric ratio of water to alcohol generally should not be less than about 1:1. Sufficient water, however, must be present in the composition to prevent substantial decomposition of the ammonium salt; and to maintain the stability of the ammonium salt generally the volumetric ratio of alcohol to water should not exceed about 5:1.

The amount of ammonium hydroxide utilized generally should be equivalent to not less than about 1.5 mole of ammonium ion to 1 mole of copolymerized crotonic acid present in the copolymer, in order to form a water-soluble ammonium salt. Preferably, this ratio should be about 2 moles of ammonium ion per mole of the crotonic acid. If desired, the ammonium ion content may be increased to as high as around 5–10 moles of ammonium ion per mole of copolymerized crotonic acid; but it is preferred not to exceed a ratio of 5:1, as at higher ammonium ion concentrations, the solutions tend to thicken or increase in viscosity on standing.

The solutions of the present invention may be prepared by different methods. In the above example the ammonium salt and the resulting solution in the mixture of alcohol and water is formed in a single operation by stirring and heating the copolymer in a solution of ammonium hydroxide in the alcohol-water mixture. The same results can also be obtained by first preparing an aqueous solution of the ammonium salt and adding the alcohol. In such case the alcohol may be added at any desired temperature, e. g., from 10 to 80° C.

In reacting the copolymer with the ammonium hydroxide to prepare the ammonium salt either in the absence or presence of an alcohol, the mixture preferably is stirred and heated at temperatures from 30 to 60° C.

The present invention provides aqueous solutions of the ammonium salts of vinyl acetate/crotonic acid copolymers in concentrations of from 30 to 50% by weight, which solutions are flowable liquids having viscosities below 60,000 centipoises. These solutions may easily be spread upon various surfaces in protective coating and adhesive applications and, upon drying, form films insoluble in water. If desired, various ingredients commonly used in coating and adhesive compositions such as pigments, plasticizers and the like may be added to the herein described ammonium salt solutions without departing from the spirit and scope of my invention.

I claim:

1. A solution comprising the ammonium salt of a vinyl acetate/crotonic acid copolymer containing 3 to 7% by weight of crotonic acid, about 1.5 to 2 moles of ammonium ion per mole of copolymerized crotonic acid and a mixture of 1 to 5 parts by volume of methanol and 1 part by volume of water, said solution containing about 20 to 50% by weight of said copolymer and having a viscosity below 60,000 centipoises at a temperature of 20 to 30° C.

2. A solution comprising the ammonium salt of a vinyl acetate/crotonic acid copolymer containing 3 to 7% by weight of crotonic acid, about 1.5 to 2 moles of ammonium ion per mole of copolymerized crotonic acid and a mixture of about 3 parts by volume of methanol and 1 part by volume of water, said solution containing about 50% by weight of said copolymer.

References Cited in the file of this patent

UNITED STATES PATENTS

| Number | Name | Date |
|---|---|---|
| 2,317,725 | Billig | Apr. 27, 1943 |
| 2,375,960 | Stoops | May 15, 1945 |